March 1, 1960 J. H. PAQUIN 2,927,304

MAGNETIC HEAD SWITCHING SYSTEM

Filed March 1, 1954 2 Sheets-Sheet 1

INVENTOR.
JAMES H. PAQUIN
BY James B. Christie
ATTORNEY

MAGNETIC HEAD SWITCHING SYSTEM

Filed March 1, 1954 2 Sheets-Sheet 2

INVENTOR.
JAMES H. PAQUIN
BY James B. Christie
ATTORNEY 2,927,304

MAGNETIC HEAD SWITCHING SYSTEM

James H. Paquin, Arcadia, Calif., assignor, by mesne assignments, to Burroughs Corporation, Detroit, Mich., a corporation of Michigan Application March 1, 1954, Serial No. 413,083

6 Claims. (Cl. 340—174)

The present invention relates to information storage systems, and more particularly to improved apparatus for the selection of one or more of a plurality of magnetic heads for recording and reading information. This invention is related to the subject matter of copending application Serial No. 315,892, filed October 15, 1952, in the name of George C. Hoberg and assigned to the same assignee.

One known system for recording information is to move a magnetizable medium relative to means for varying the magnetic flux density passing through a selected area of the medium whereby the condition of magnetization of the magnetizable medium is a function of the electrical signals applied to the flux density varying means. The magnetizable medium may take the form of a wire, a magnetizable tape having a coating of magnetizable material, or a drum at least the periphery of which comprises magnetizable material.

The means for varying the magnetic flux density frequently comprises one or more coils of wire surrounding a magnetic core which is so disposed relative to the magnetizable medium as to impress a portion of the magnetic flux generated as a result of an electric current flowing through the windings on the area of the magnetizable medium immediately adjacent the flux varying means. Flux varying means of this type are frequently referred to as magnetic heads. In addition to recording information, a magnetic head of this type may be used to derive or read the information represented by the condition of magnetization of a magnetizable medium by passing the magnetizable medium adjacent to the head so that an electrical signal is induced in the windings due to the variation in the flux from the magnetizable medium.

In digital computing systems, as well as in other applications, a rotating drum having a magnetizable periphery frequently is included to provide an internal memory. These drums are well suited to store a large quantity of digital information.

In general, the arithmetic operations performed by such computers are accomplished electronically and therefore take place at a very rapid rate. It has been found that the time required for recording on, or reading from, a selected area of a magnetic drum limits the overall speed in a digital computer. For this reason, a plurality of recording and/or reading heads may be disposed around the periphery and along the length of the rotating magnetic drum so that a particular area of the magnetic drum to be recorded or read from may be selected in less time than it takes for a complete revolution of the magnetic drum. Therefore, the problem arises to select or actuate one or more of the heads which are closest to the selected area.

Also, since each of the magnetic heads is commonly used for both recording and reading from the drum, it is necessary to provide some means for applying electrical signals representing information to the magnetic head during a recording interval and applying the electrical signal derived from the magnetic head to a reading amplifier during a reading interval.

One of the early methods for selecting magnetic heads for reading or recording used relays, but due to the inertia of the relays, such head selection systems were relatively slow in operation. Where greater speed is desired, electronic head selection is commonly employed. However, one of the disadvantages of conventional electronic head selection apparatus is that an undesirable transient wave occurs at the instant of head selection which may upset the operation of the circuitry to which the head is connected, as for example a reading amplifier. Until such a transient decays to an amplitude smaller than the signal derived from the head, no information can be read. This is particularly true in conventional systems which usually employ a square wave type of gating signal. In addition, it is desirable that some means be included for eliminating the gating signal from the input of a reading amplifier.

My invention provides improved apparatus for electronically selecting one or more of a plurality of magnetic heads for recording or reading purposes, along with improved apparatus for applying electrical signals to the selected recording heads when recording is desired, and means for transferring electrical signals from the magnetic heads to reading amplifiers for reading from a magnetic storage medium without objectionable transients.

In accordance with my invention, I provide unilateral conduction devices in series with the coils of each of a plurality of magnetic heads, all of which are connected in parallel with a source of information to be recorded, means for transferring the electrical signals derived from selected ones of the magnetic heads to a reading amplifying means which is adapted to cancel transient signals appearing as a result of head selection.

In one embodiment, the windings of a plurality of magnetic heads each are connected serially with two unilateral conduction devices across a pair of output leads from a source of information which is adapted to provide a signal on one of the output leads which is out of phase with respect to a signal appearing on the other of the output leads. Individual ones of the magnetic heads may be selected for recording or reading by rendering conducting the unilateral conduction devices associated with the particular heads selected, thereby causing the signals supplied from the source of information to be applied to the selected ones of the heads. Also, each magnetic head and its associated unilateral conduction devices is coupled to an amplifying means whereby the signals appearing across selected ones of the magnetic heads are applied to a reading amplifier in such a way that signals appearing as a result of head selection are cancelled.

Other features of advantage of the present invention will be appreciated upon a reading of the following specification in connection with the drawings in which.

Figure 1:
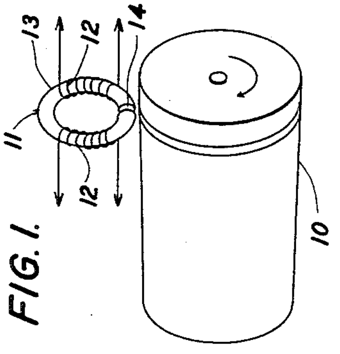
Fig. 1 is a simplified diagram of a drum for magnetic recording and a magnetic head which may be employed for both recording on and reading from a magnetic drum.

Fig. 1 is a simplified diagram of one type of magnetizable medium comprising a rotating magnetic drum 10 having a magnetizable periphery and one type of magnetic head 11 comprising a pair of windings 12 which are linked by a common magnetic core 13 having a gap 14 disposed adjacent the magnetizable periphery of the drum 10. By suitably energizing the windings 12 by means of an electrical signal to be recorded, the flux appearing in the gap 14 varies in accordance with the electrical signal and results in a variation in the condition of the magnetization of the periphery of the magnetic drum 10. Although the invention is applicable in a system using a plurality of magnetic heads and may be used with any type of magnetizable recording medium, the arrangement of Fig. 1 is exemplary.

Figure 2:
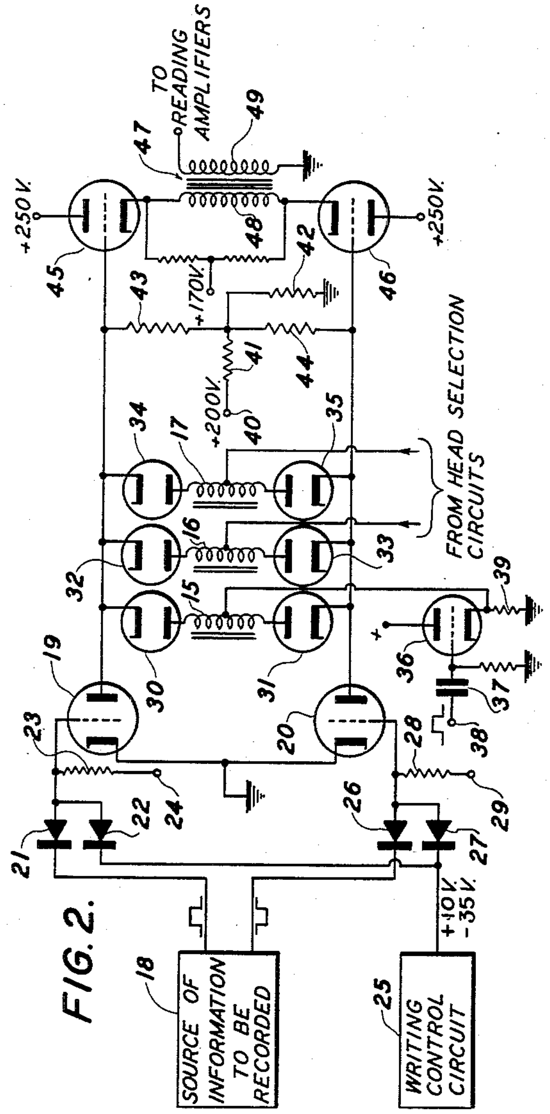
Fig. 2 is a combination block and schematic circuit diagram of an embodiment of my invention in which the unilateral conduction devices comprise diodes connected serially with magnetic heads.

Fig. 2 shows an embodiment of the invention in which a plurality of magnetic heads 15, 16 and 17 may be selectively energized for recording or reading. Each of these magnetic heads may be similar to the simplified version of Fig. 1 or may be any other suitable type. The windings 12 of the magnetic head 11 of Fig. 1 may be connected serially so as to effectively form a single winding which is center-tapped like the magnetic heads 15, 16 and 17 of Fig. 2.

Electrical signals representing information to be recorded may be provided by a source of information 18 which provides two outputs each of which is out of phase with respect to the other. For example, the information source may include a bi-stable multivibrator, the two outputs being derived from opposite stages of the multivibrator, whereby one output is at a high voltage level and the other output is at a low voltage level, and vice versa. In instances where it is desired to record digital information, a signal may be applied on one of the outputs for the binary condition termed "0" and a signal may be applied on the other of the outputs for a binary condition termed "1" as represented by the respective low and high voltage levels. These signals are applied to the electron tubes 19 and 20 via a logical "and" circuit which renders the electron tubes 19 and 20 nonconducting where it is desired to read previously recorded information. The logical "and" circuit comprises the diodes 21 and 22, along with a resistance 23 in the case of the electron tube 19, and the diodes 26 and 27 and a resistance 28 in the case of the electron tube 20.

By applying a positive potential to the terminal 24, a threshold is established on one side of the diodes 21 and 22. The writing control circuit 25 can be set to provide at the output one or the other of two suitable voltage levels, which levels may be the same as the two levels provided by the information source 18. One voltage level tends to render the diode 22 nonconducting when it is desired to perform a writing operation and the other more negative voltage level renders the diode 22 conducting for a reading operation. Thus, when a writing signal tends to render the diode 22 nonconducting and a signal appears from the source of information 18 which tends to render the diode 21 nonconducting, the electron tube 19 is rendered conducting by the positive potential applied at 24, and the potential at the anode of the electron tube 19 approaches the potential of the cathode. Should either one of the diodes 21 or 22 be substantially conducting, however, the electron tube 19 is biased to cut off by the resultant voltage drop across the resistor 23, thereby resulting in a relatively high positive potential at the anode.

The operation of the electron tube 20 and its associated "and" circuit comprising diodes 26 and 27, a resistance 28 and a terminal 29 to which a threshold potential may be applied is identical to that described with reference to the amplifying electron tube 19.

During a writing operation where digital information of binary character is to be recorded, the difference in potential between the anode of the electron tube 19 and the anode of the electron tube 20 represents one value of binary digit when of one polarity, and other value of binary digit when of opposite polarity. This difference in potential is coupled across a winding 15 of a magnetic head via unilateral conduction devices, such as diodes 30 and 31, across a magnetic head winding 16 via the diodes 32 and 33, and across other magnetic head windings, such as a winding 17 via the diodes 34 and 35.

The unilateral conduction devices associated with each of the magnetic head windings are normally maintained nonconducting by means of voltages derived from head selection circuits applied via the center taps of each of the magnetic head windings.

One form of specific circuitry for one suitable type of head selection circuit is shown connected to the center tap of the winding 15 in which a cathode follower electron tube 36 has a gating signal applied to its control electrode via a coupling capacitance 37 and a terminal 38 from a source not shown.

When a gating signal arrives, the control electrode of the cathode follower electron tube 36 is biased positively and the voltage across a cathode resistance 39 goes positively by a suitable amount to render the diodes 30 and 31 conducting. Since in their conducting condition the diodes 30 and 31 have a relatively low impedance, the magnetic head winding 15 is coupled substantially directly between the anodes of the electron tubes 19 and 20. Any difference in potential between the anodes of the electron tubes 19 and 20 results in a current through the magnetic head winding 15 in a direction corresponding to the difference in voltage at the anodes of electron tubes 19 and 20 thereby setting up magnetic flux which in turn magnetizes an area on a magnetizable medium in response to the information from the source 18. By applying gating pulses to head selection circuits (not shown) which are connected to the center taps of the windings of other magnetic heads, such as magnetic heads 16 and 17, individual ones of a plurality of magnetic heads may be selected for recording.

The cathodes of the diodes 30, 31, 32, 33, 34, 35 receive a positive threshold potential via a terminal 40 and a voltage divider comprising a resistance 41 and a resistance 42. The cathodes of the diodes 30, 32, 34 are connected to the junction between the resistances 41 and 42 via a resistance 43 and in a similar manner the cathodes of the diodes 31, 33, 35 are connected to the junction between the voltage dividing resistances 41 and 42 via a resistance 44.

During a reading operation the writing control circuit 25 is adapted to render diodes 22 and 27 conducting, thereby biasing electron tubes 19 and 20 to cut off. A selected magnetic head may be actuated for reading by supplying a gating pulse to a head selection circuit in the same manner as for recording. Thus, in the case of the magnetic head winding 15, the diodes 30 and 31 are rendered conducting and the voltage induced in the winding 15 due to the time rate of change of magnetic flux intersecting the winding 15 from a previously recorded magnetizable medium causes a potential difference to appear between the control electrodes of the reading electron tubes 45 and 46.

Although other arrangements may be employed, the output in the case of Fig. 2 is taken from a common cathode circuit coupled between the reading electron tubes 45 and 46 via a transformer 47 having one winding 48 connected between the cathodes of the electron tubes 45 and 46, and having a secondary winding 49 across which the output signal appears from whence it may be applied to any suitable reading amplifier. The two reading tubes 45 and 46, connected as cathode follower stages, act as differential amplifying means, since the voltage appearing across transformer windings is proportional to the difference in voltage between the two grids. In the arrangement of Fig. 2, the gating pulse applied to the terminal 38, along with any transient signal generated due to the head selection operation appears at the control electrodes of the electron tubes 45 and 46 in the same phase. Consequently, the square wave gating signal and the transient signals are cancelled across the winding 48 of the transformer 47 and do not appear in the output signal appearing across the winding 49.

Figure 3:
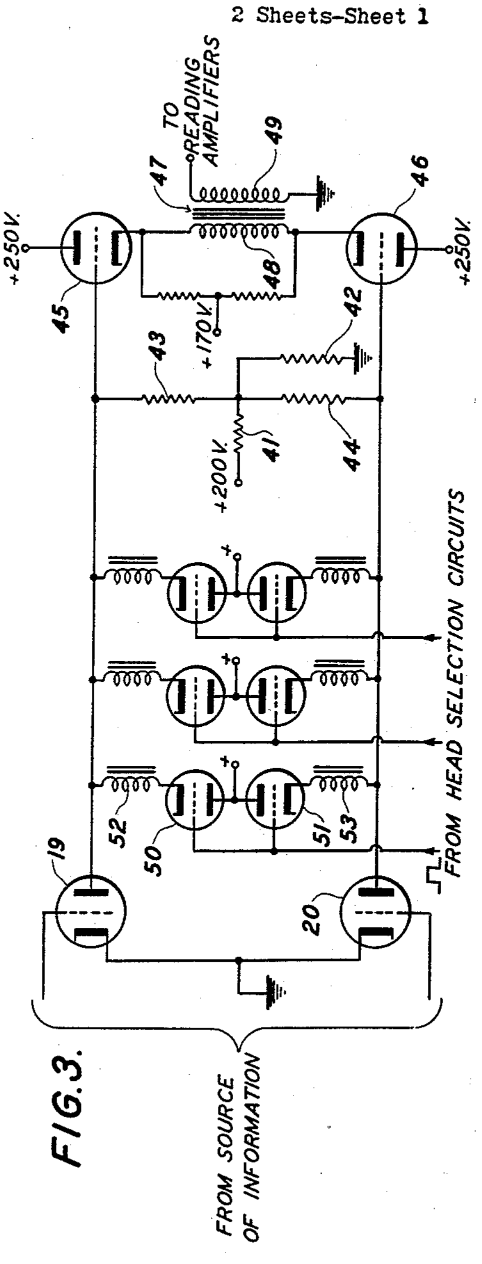
Fig. 3 is a partial schematic circuit diagram of an embodiment of my invention in which the unilateral conduction devices comprise triodes connected serially with magnetic heads.

Fig. 3 shows an embodiment of the present invention in which the unilateral conduction devices connected serially with the windings of the magnetic heads are electron tubes having at least a cathode, anode and control electrode. Although triode-type electron tubes are illustrated, it will be appreciated that other types may be used as well. Inasmuch as the circuitry of Fig. 3, apart from that which is associated directly with the magnetic heads, is identical to that of Fig. 1, only a portion has been shown and in that portion the reference characters are the same. Essentially the operation of the apparatus is the same as that shown in Fig. 2. However, by connecting two triode electron tubes 50 and 51 back to back with a common connection between the anodes, the separate windings 52 and 53 of the magnetic head may each be connected between the cathode of one of the electron tubes 50 and 51 and one of the anodes of electron tubes 19 and 20. By applying a positive going gating signal from suitable head selection circuitry (not shown) to the control electrodes of electron tubes 50 and 51, the electron tubes may be rendered conducting, thereby effectively connecting the windings 52 and 53 serially between the anodes of electron tubes 19 and 20. The advantage of using triode electron tubes is that the gating signals need not supply as much power as that which is required for diodes. In other respects the operation of the apparatus of Fig. 3 is the same as that shown in Fig. 2.

Figure 4:
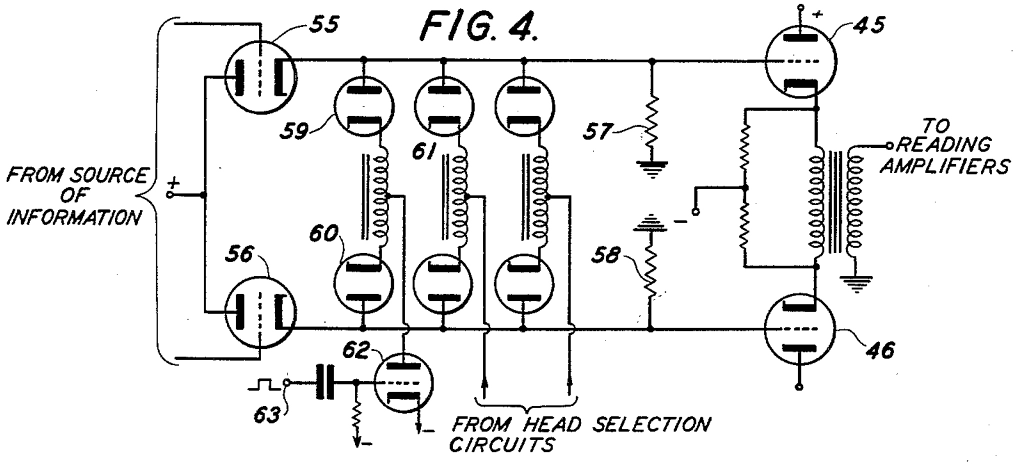
Fig. 4 is a partial schematic circuit diagram of an embodiment of my invention which is adapted for use with a source of information having a cathode follower output, and in which the unilateral conduction devices comprise diodes.

Fig. 4 shows a partial schematic diagram of an embodiment of the invention for use where it is desired to record signals supplied from a cathode follower output. Thus, the electron tubes 55 and 56 have their cathodes connected to ground reference potentials via suitable cathode resistances 57 and 58, respectively. It will be noted that the diodes 59 and 60 are reversed in their directions of conduction with respect to that shown in Fig. 2. These diodes may be rendered conducting so as to effectively connect the magnetic head winding 61 between the cathodes of the electron tubes 55 and 56 by rendering the diodes 59 and 60 conducting. This may be accomplished from a head selection circuit comprising an electron tube 62 and associated circuitry whereby the center tap of the winding 61 is energized negatively when a positive gating signal is applied to the terminal 63. An additional number of magnetic head windings with their associated diodes may be connected between the cathodes of the electron tubes 55 and 56 as shown and the output for a reading operation in which a suitable means renders the electron tubes 55 and 56 non-conducting (not shown) appears across the cathode resistances 57 and 58 and is applied to suitable reading electron tubes 45 and 46 in a manner similar to that of Fig. 2.

Figure 5:
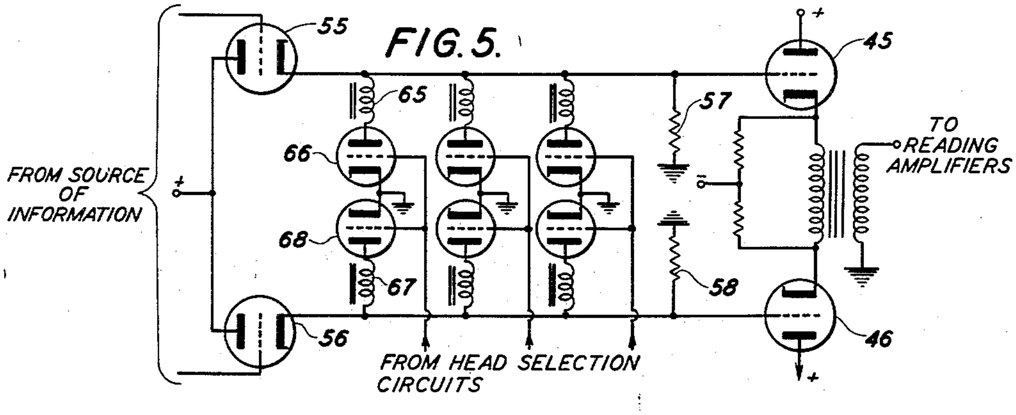
Fig. 5 is a partial schematic circuit diagram of an embodiment of my invention which is adapted for use with a source of information having a cathode follower output, and in which triodes are used as unilateral conduction devices.

The partial schematic circuit diagram of Fig. 5 shows an embodiment of the invention in which triode electron tubes are used as unilateral conduction devices serially connected with the windings of a magnetic head for use where signals are to be recorded from a cathode follower output. This circuitry is similar to that of Fig. 3 except that the direction of conduction of the triode electron tubes is reversed. Thus, one coil 65 of a magnetic head is connected between the cathode of a writing electron tube 55 and the anode of a triode head switching electron tube 66 and in a like manner a coil 67 of the same magnetic head is connected between the cathode of a writing electron tube and the anode of a triode head switching electron tube 68. A common connection between the cathode of electron tubes 66 and 68 may be connected to ground reference potential as shown or to a suitable source of threshold potential for biasing the electron tubes, if desired. By applying positive gating signals from suitable head selection circuits (not shown) through the control electrode of electron tubes 66 and 68, the magnetic head coils 65 and 67 may be effectively connected between the cathodes of the electron tubes 55 and 56. In other respects the circuitry of Fig. 5 may be identical to that of Fig. 4.

Figure 6:
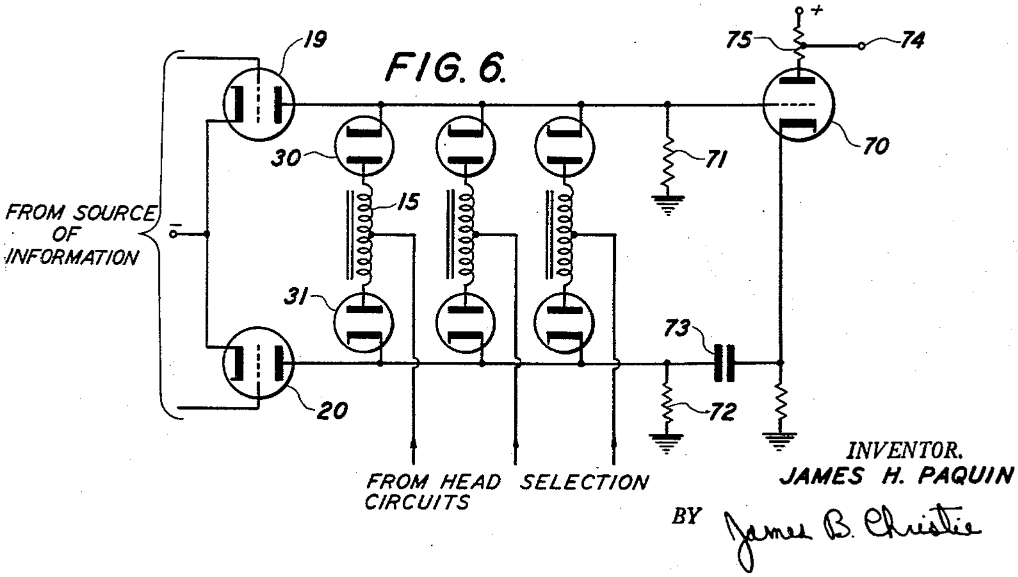
Fig. 6 is a partial schematic circuit diagram of an embodiment of my invention which is adapted to apply reading signals to a single amplifier tube.

Fig. 6 shows a partial schematic circuit diagram of an embodiment of the present invention which is adapted to work in conjunction with a differential amplifying circuit using a single reading electron tube 70. Similar reference characters have been employed for the diodes 30 and 31 and the magnetic head winding 15 along with the reading electron tubes 19 and 20 as were used in the embodiment of Fig. 2, since except for the connection to the differential amplifying electron tube 70, the circuit may be identical. However, it will be noted that no threshold voltage is applied to the diodes of Fig. 6. If such is desired, the resistors 71 and 72 may be connected to a suitable source of potential instead of to ground reference potential. During a reading operation, when the electron tubes 19 and 20 are inoperative and when the diodes associated with one of the magnetic heads are rendered conducting, the electrical signal induced in the magnetic head is applied between the control electrode of the differential amplifying electron tube 70 and the cathode via a coupling capacitance 73. As is well-known, a differential amplifier may be adapted to convert a push-pull input to a single-ended output. This is accomplished in the circuits of Figs. 2–5 by the transformer. With the present single tube type of differential amplifier, where digital information is supplied on the control electrode for one value of digital information and on the cathode for another value of digital information, the operation is similar to a push-pull operation and a single-ended output appears at the terminal 74 across the load resistance 75. For a positive signal on the control electrode of the differential amplifying electron tube 70, the anode will drop in potential, thereby providing one value at the terminal 74. Where a negative signal is applied to the control electrode of the differential amplifying electron tube 70, the electron tube will tend to be cut off, thereby increasing the voltage at the anode and a higher level of voltage will appear at the terminal 74. Thus, for one value of digital information, the voltage at the terminal 74 is at one level and for another value of digital information, the voltage at the terminal 74 is at another level.

Since any gating signals or transient signals caused by switching appear at the control electrode and the cathode of the differential amplifying electron tube 70 in like polarity, these signals will be substantially cancelled and will not appear in any great degree at the terminal 74.

Although the invention has been described in a system for recording and reading digital information, it will be appreciated that it may be employed for the selection of one or more of a plurality of recording or reading heads where the information is what is sometimes termed "analogue." This means that a continuously varying signal as well as digital signals may be recorded or read by magnetic heads selected in accordance with the principles of this invention.

I claim:

1. A combined magnetic recording and reading system including the combination of, a pair of writing electron tubes each of which has a cathode, a control electrode and an anode, means applying digital signals to be recorded to the control electrodes of said writing electron tubes, a pair of reading electron vacuum tubes each of which has a control electrode, cathode and anode, means connecting the anode of one of said writing electron tubes to the control electrode of one of said reading electron tubes, means connecting the anode of the other of said writing electron tube to the control electrode of the other of said reading electron tubes, a plurality of magnetic heads having windings, a pair of unilateral conduction devices connected serially with the windings of each of said plurality of magnetic heads between the anode of one of said writing electron tubes and the anode of the other of said writing electron tubes, means rendering conducting the serially connected unilateral conduction devices associated with selected ones of said magnetic heads, whereby the selected magnetic head windings are coupled between the anodes of said writing electron tubes, and means rendering said writing electron tubes nonconducting whereby signals derived from selected ones of said magnetic heads during a reading operation are applied to the control electrodes of said reading electron tubes, a transformer having a primary and a secondary winding, said primary winding being coupled between the cathodes of said reading electron tubes whereby signals derived from said magnetic heads during a writing interval appear across the secondary winding of said transformer and whereby transient signals appearing as a result of head selection are substantially cancelled.

2. Apparatus in accordance with claim 1 in which said unilateral conduction devices comprise diodes, and said magnetic heads each include a center-tapped winding which is connected serially between a pair of said diodes.

3. Apparatus in accordance with claim 1 in which said unilateral conduction devices are electron tubes having at least a cathode, anode and control electrode, said magnetic heads include two windings one of which is connected between the cathode of one of said unilateral conduction devices and the anode of said writing electron tube and the other of which windings is connected between the cathode of another of said unilateral conduction devices and the anode of the other of said writing electron tubes, and means rendering said electron tubes associated with said magnetic head windings conducting in response to a positive going gating signal applied to the control electrodes of said electron tubes.

4. A magnetic recording and reading circuit comprising a plurality of magnetic heads, each of the heads including windings having separate portions, means for passing current through separate portions of the windings of each head including unidirectional conductive means in series with the respective portions of the windings for limiting the flow of current in one direction in each portion, the series-connected windings and unidirectional conductive means associated with the respective magnetic heads being connected in parallel with each other, means responsive to a binary information signal in which the two binary conditions are represented by two different potential levels for selectively establishing potentials of opposite polarity across the winding portions of a selected head, the polarity being reversed with changes between the two potential levels of the binary information signal from the source, whereby one binary condition produces current flow in one winding portion and the other binary condition produces current flow in the other winding portion of the selected head, and means for reading out binary information in response to currents induced in selected ones of the heads including differential amplifying means coupled across the parallel connected heads and responsive to voltage changes across one of the parallel heads during a reading interval.

5. Apparatus as defined in claim 4 wherein the reading out means includes a pair of vacuum tubes each having a cathode, anode, and control electrode, and an output transformer having a primary winding thereof connected between the cathodes, the parallel connected heads being connected between the control electrodes.

6. Apparatus as defined in claim 5 wherein each of the unidirectional conductive means comprises a vacuum tube having a cathode, anode, and a control electrode, and further includes means for selectively controlling the bias on the control grids of pairs of said vacuum tubes associated with selected ones of the heads.

References Cited in the file of this patent

UNITED STATES PATENTS

| | | |
|---|---|---|
| 2,540,654 | Cohen | Feb. 6, 1951 |
| 2,549,071 | Dusek | Apr. 17, 1951 |
| 2,611,025 | Jankowski | Sept. 16, 1952 |
| 2,713,676 | Fleming | July 19, 1955 |

OTHER REFERENCES

"Combined Reading and Writing on a Magnetic Drum" (McGuigan), Proceedings of the IRE, October 1953, pp. 1438–1444.